(12) United States Patent
Jeung

(10) Patent No.: US 8,701,431 B2
(45) Date of Patent: Apr. 22, 2014

(54) AIR CONDITIONER

(75) Inventor: Jong Hwan Jeung, Changwon-si (KR)

(73) Assignee: LG Electronics Inc., Seoul (KR)

( * ) Notice: Subject to any disclaimer, the term of this patent is extended or adjusted under 35 U.S.C. 154(b) by 950 days.

(21) Appl. No.: 12/758,537

(22) Filed: Apr. 12, 2010

(65) Prior Publication Data

US 2011/0088422 A1 Apr. 21, 2011

(30) Foreign Application Priority Data

Oct. 16, 2009 (KR) .................. 10-2009-0098859

(51) Int. Cl.
| F25D 23/12 | (2006.01) |
| F25D 17/04 | (2006.01) |
| F25D 17/08 | (2006.01) |
| F25D 17/06 | (2006.01) |
| F25B 49/00 | (2006.01) |

(52) U.S. Cl.
USPC ............. 62/259.1; 62/408; 62/412; 62/419; 62/426; 62/427; 62/277; 62/428; 62/262; 62/263

(58) Field of Classification Search
USPC ........ 62/259.1, 408, 412, 419, 426, 277, 427, 62/428, 262, 263; 454/237, 252, 234, 249; 165/54, 137, 166, 167; 285/179–183, 285/189–222
See application file for complete search history.

(56) References Cited

U.S. PATENT DOCUMENTS

| 3,988,030 | A | * | 10/1976 | Twedell | .......... 285/183 |
| 5,226,681 | A | * | 7/1993 | Smith et al. | .......... 285/200 |
| 5,538,293 | A | * | 7/1996 | Kolt | .......... 285/24 |
| 5,957,506 | A | * | 9/1999 | Stepp | .......... 285/183 |
| 6,209,622 | B1 | * | 4/2001 | Lagace et al. | .......... 165/8 |
| 6,336,338 | B1 | * | 1/2002 | Koren | .......... 62/262 |
| 6,516,874 | B2 | * | 2/2003 | Mathur et al. | .......... 165/166 |
| 7,259,337 | B1 | * | 8/2007 | Gretz | .......... 174/481 |
| 2007/0045437 | A1 | * | 3/2007 | Wolfson | .......... 236/49.3 |
| 2008/0160904 | A1 | * | 7/2008 | Yi et al. | .......... 454/309 |
| 2008/0210412 | A1 | * | 9/2008 | Arai et al. | .......... 165/164 |
| 2011/0016902 | A1 | * | 1/2011 | Eisenhour | .......... 62/271 |

FOREIGN PATENT DOCUMENTS

| JP | 06-341676 | | 12/1994 |
| JP | 2002-257380 | | 9/2002 |
| JP | 2007-064513 | | 3/2007 |
| KR | 10-2003-0052225 | * | 2/2005 |
| KR | 10-2005-0074826 A | | 7/2005 |

* cited by examiner

*Primary Examiner* — Frantz Jules
*Assistant Examiner* — Erik Mendoza-Wilkenfe
(74) *Attorney, Agent, or Firm* — McKenna Long & Aldridge LLP

(57) ABSTRACT

An air conditioner is provided. The air conditioner includes: an indoor device installed at indoor; an outdoor device connected to the indoor device using a refrigerant pipe; a ventilation unit for exchanging heat of outdoor air and indoor air while ventilating indoor air and outdoor air; and a guidance duct for communicating the ventilation unit and an air inhalation portion of the outdoor device in order to guide indoor air exhausted from the ventilation unit to an air inhalation portion faulted in the outdoor device. Therefore, the number of ventilation holes to form in an outer wall of a building can be minimized, a construction cost can be reduced, and performance of the air conditioner can be improved.

13 Claims, 13 Drawing Sheets

AIR CONDITIONER

This application claims priority to Korean Patent Application No. 10-2009-0098859, filed Oct. 16, 2009 in the Republic of Korea, the contents of which is incorporated herein by reference in its entirety.

BACKGROUND OF THE INVENTION

1. Field of the Invention

The present invention relates to an air conditioner, and more particularly, to an air conditioner having an indoor device, an outdoor device, and a ventilation unit.

2. Description of the Related Art

In general, an air conditioner sustains indoor air to provide a comfortable environment to a human being and absorbs heat from indoor, emits heat to indoor, or enhances a clean degree of indoor.

The air conditioner is largely classified into an integral type and a separation type, and the separation type air conditioner includes an indoor device positioned at indoor and an outdoor device installed at a location other than indoor in which the indoor device performs air-conditioning.

When the outdoor device is installed in an outdoor device installation stand installed to protrude to the outside of a building, or is installed in a veranda, which is a portion of a building, the outdoor device exchanges heat by directly inhaling outdoor air and discharges again the outdoor air to outdoor, and when the outdoor device is installed in a building such as a commercial building, the outdoor device is installed in an outdoor device installation room formed in the building to exchange heat by inhaling outdoor air into the building and discharges the outdoor air to the outside of the building.

Nowadays, in order to provide more comfortable air to indoor, a ventilation unit for ventilating indoor air and outdoor air by discharging indoor air to the outside and inhaling outdoor air into indoor space is installed in the air conditioner.

In general, upon performing a heating operation, outdoor air is in a temperature lower than that of indoor air, and upon performing a cooling operation, outdoor air is in a temperature higher than that of indoor air and thus when the ventilation unit ventilates outdoor air and outdoor air, heating performance/cooling performance is lowered.

When a heat exchanger for exchanging heat of indoor air and outdoor air is installed in the ventilation unit, a temperature of outdoor air rises or falls by exchanging heat with indoor air while passing through the heat exchanger and the outdoor air is injected into indoor and thus a temperature difference between outdoor air injected into indoor space and indoor air exhausted to outdoor can be reduced and deterioration of heating performance/cooling performance due to ventilation can be minimized.

When the ventilation unit is installed in an outdoor device installation room together with the outdoor device, an outdoor air inhalation ventilating opening for inhaling outdoor air and an indoor air exhaust ventilating opening for exhausting indoor air should be each constructed in a building, a ventilation exhaust duct for communicating the ventilation unit and outdoor is disposed between the ventilation unit and an indoor air exhaust ventilating opening, and when an outdoor device installation room is small and narrow, a connection operation of the ventilation exhaust duct is not easy.

Further, when outdoor is in a low temperature, frost is generated in an outdoor device, the air conditioner delays generation of frost or performs a defrost operation for defrost, and when performing a defrost operation, indoor is not heated, and thus heating performance is lowered due to a defrost operation.

SUMMARY OF THE INVENTION

The present invention has been made in an effort to solve the above problems, and the present invention provides an air conditioner that can minimize a ventilation hole for installing a ventilation unit and that can reduce a construction cost.

The present invention further provides an air conditioner that can enhance defrost performance of an outdoor device with indoor air exhausted from a ventilation unit.

The present invention further provides an air conditioner that can effectively install a ventilation unit and an outdoor device even in a small and narrow space.

According to an aspect of the present invention, there is provided an air conditioner including: an indoor device installed at indoor; an outdoor device connected to the indoor device using a refrigerant pipe; a ventilation unit for exchanging heat of outdoor air and indoor air while ventilating indoor air and outdoor air; and a guidance duct for communicating the ventilation unit and an air inhalation portion of the outdoor device in order to guide indoor air exhausted from the ventilation unit to the air inhalation portion formed in the outdoor device.

The ventilation unit may have a plurality of guidance duct connection parts with which the guidance duct is communicated, and the guidance duct may be selectively communicated with one of the plurality of guidance duct connection parts.

The plurality of guidance duct connection parts may be formed in different directions in an outer surface of the ventilation unit.

The plurality of guidance duct connection parts may include: a first guidance duct connection part formed in one of a front surface and a rear surface of the ventilation unit; and a second guidance duct connection part formed in one of a left surface and a right surface of the ventilation unit.

The air conditioner may further include stoppers for blocking a guidance duct connection part with which the guidance duct is not communicated among the plurality of guidance duct connection parts.

The air conditioner may further include a damper for opening and closing the guidance duct.

The guidance duct may include: a connection duct installed in the outdoor device to be opposite to a portion of the air inhalation portion; and an exhaust duct for connecting the ventilation unit and the connection duct.

The connection duct may be made of a material harder than that of the exhaust duct.

The connection duct may include: an exhaust duct communication portion communicated with the exhaust duct; a fastening portion fastened to the outdoor device; an extension portion formed between the exhaust duct communication portion and the fastening portion and having a flow path enlarging as advancing toward the air inhalation portion.

The exhaust duct may be formed to extend and retract or bend.

The guidance duct may have a fastening portion fastened to the outdoor device in a variable fastening height.

The outdoor device may include a base, left and right side panels installed at the upper side of the base, and a top panel installed at the upper side of the left and right side panels, at least one of the left and right side panels may have at least one opening forming the air inhalation portion, and the guidance duct may have a fastening portion fastened around the opening.

The fastening portion may have a fastening hole for fastening to the outdoor device using a screw, at least one of the left and right side panels may have a fastening hole around the opening, and the screw may be fastened to the fastening hole formed around the opening by penetrating a fastening hole of the fastening portion.

The fastening portion may include a magnet to be detached with a magnetic force to the outdoor device, and the magnet may be detached to a periphery of the opening with a magnetic force.

The fastening portion may include a hook inserted into the opening to be latched.

The ventilation unit may include: a ventilation heat exchanger for exchanging heat of indoor air and outdoor air; a ventilation fan for sending indoor air to the outdoor device after passing through the ventilation heat exchanger and for sending outdoor air to indoor after passing through the ventilation heat exchanger; and a ventilation case having the ventilation heat exchanger and the ventilation fan therein and having a guidance duct connection part to which the guidance duct is connected.

In the ventilation heat exchanger, an indoor air flow path through which indoor air passes and an outdoor air flow path through which outdoor air passes may be partitioned with an electric heat member interposed therebetween.

The ventilation case may have an outdoor air inhalation duct connection part to which an outdoor air inhalation duct is connected, an outdoor air exhaust duct connection part to which an outdoor air exhaust duct is connected, and an indoor air inhalation duct connection part to which an indoor air inhalation duct is connected.

The ventilation unit may be separated from the outdoor device at the upper side of the outdoor device.

According to another aspect of the present invention, there is provided an air conditioner including: an indoor device installed at indoor; an outdoor device connected to the indoor device using a refrigerant pipe; a ventilation unit for exchanging heat of outdoor air and indoor air while ventilating indoor air and outdoor air; and a guide means for guiding indoor air exhausted from the ventilation unit to an air inhalant unit formed in the outdoor device.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF THE PREFERRED EMBODIMENT

Hereinafter, an air conditioner according to exemplary embodiments of the present invention is described with reference to the accompanying drawings.

Figure 1:
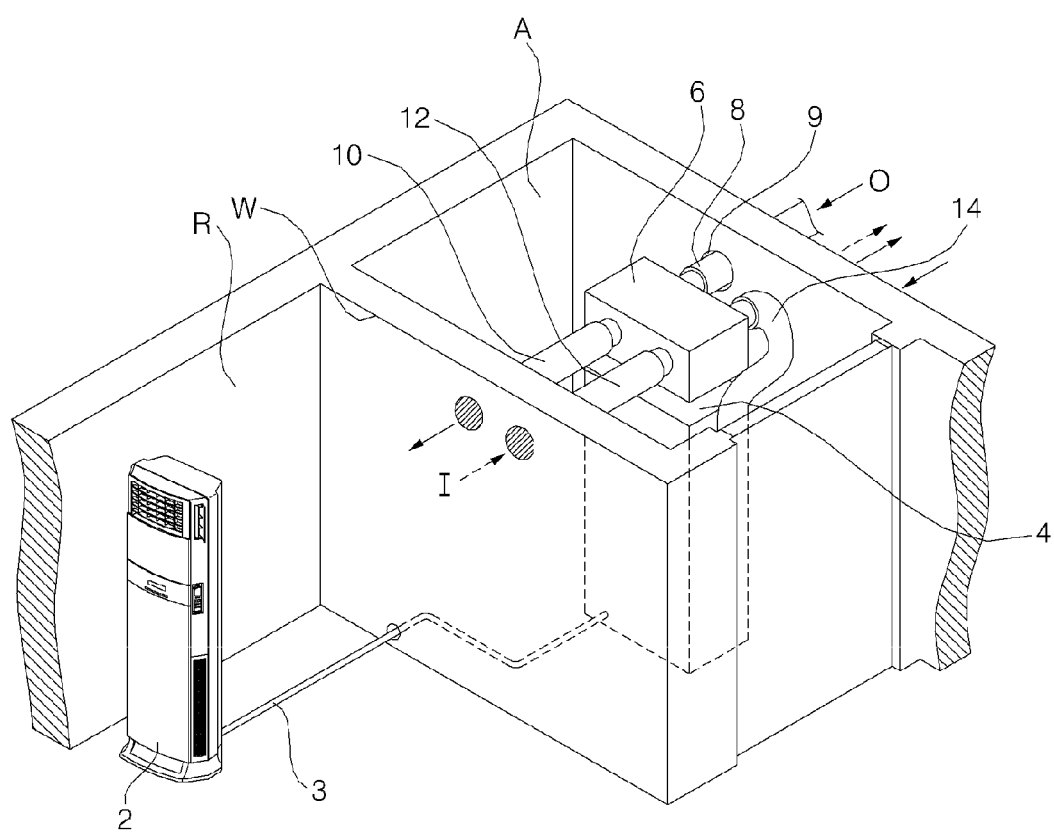
FIG. 1 is a schematic diagram illustrating an air conditioner according to an exemplary embodiment of the present invention.

FIG. 1 is a schematic diagram illustrating an air conditioner according to an exemplary embodiment of the present invention.

The air conditioner according to the present exemplary embodiment includes an indoor device 2 installed in indoor R, an outdoor device 4 connected to the indoor device 2 by a refrigerant pipe 3, and a ventilation unit 6 for ventilating indoor air I and outdoor air O and exchanging heat of the indoor air I and the outdoor air O, as shown in FIG. 1.

The indoor device 2 inhales the indoor air I, exchanges heat of the indoor air I and a refrigerant, and discharges the indoor air I to indoor and is installed within indoor R to perform air-conditioning, is installed at a ceiling of indoor R to perform air-conditioning, or is installed at a location other than the indoor R to perform air-conditioning and is connected to the indoor R to perform air-conditioning using an inhalation/exhaust duct.

The indoor device 2 includes an indoor heat exchanger for exchanging heat of the indoor air I and a refrigerant and an outdoor fan for circulating the indoor air I to the indoor device 2.

The outdoor device 4 and the ventilation unit 6 may be installed together with the indoor device 2 in the indoor R in which the indoor device 2 is installed, and may be installed together in an outdoor device installation room A partitioned from the indoor R in which the indoor device 2 is installed.

The outdoor device 4 inhales the outdoor air O, exchanges heat of the outdoor air O and a refrigerant, and discharges the outdoor air O to outdoor, and when the outdoor device 4 is installed in an outdoor device installation room A, the outdoor device 4 inhales outdoor air through an opening G such as a grill formed in the outdoor device installation room A and discharges the outdoor air O through the opening G such as a grill.

When the ventilation unit 6 is installed in the outdoor device installation room A, if an outdoor device installation room A is small and narrow, installation of the ventilation unit 6 is not easy, and thus it is preferable to install the ventilation unit 6 in an approximately upper part of the outdoor device installation room A, and particularly, it is preferable to install the ventilation unit 6 to separate from the outdoor device 4 at an upper position of the outdoor device 4.

When the ventilation unit 6 is installed in the indoor R together with the outdoor device 4, the outdoor air inhalation duct 8 for inhaling the outdoor air O and a guidance duct 14 for exhausting indoor air I are connected, and when the ventilation unit 6 is installed in the outdoor device installation room A together with the outdoor device 4, the outdoor air inhalation duct 8 for inhaling the outdoor air O, an outdoor air exhaust duct 10 for exhausting the inhaled outdoor air O to the indoor R, an indoor air inhalation duct 12 for inhaling the indoor air I, and the guidance duct 14 for exhausting the indoor air I are connected.

Hereinafter, a case where the outdoor device 4 and the ventilation unit 6 are installed together in the outdoor device installation room A is illustrated.

The outdoor air inhalation duct 8 communicates outdoor and the ventilation unit 6 in order to supply outdoor air to the ventilation unit 6 and is disposed to penetrate a ventilation hole 9 formed in an outer wall of a building.

In order to supply outdoor air within the ventilation unit 6 to indoor, the outdoor air exhaust duct 10 communicates indoor and the ventilation unit 6 or communicates the indoor device 2 and the ventilation unit 6 and is disposed to penetrate a wall W between the outdoor device installation room A and indoor or is disposed to penetrate the ceiling.

In order to supply indoor air to the ventilation unit 6, the indoor air inhalation duct 12 communicates indoor and the ventilation unit 6 or communicates the indoor device 2 and the ventilation unit 6 and is disposed to penetrate the wall W between the outdoor device installation room A and indoor or is disposed to penetrate the ceiling.

The guidance duct 14 is a guidance means for guiding indoor air exhausted from the ventilation unit 6 to an air inhalation portion 24 (shown in FIG. 3) formed in the outdoor device 4 and in order to supply indoor air of the ventilation unit 6 to the outdoor device 4, one end of the guidance duct 14 is connected to the ventilation unit 6 and the other end thereof is connected to the outdoor device 4 so as to communicate the ventilation unit 6 and the outdoor device 4.

The guidance duct 14 communicates the ventilation unit 6 and the air inhalation portion 24 of the outdoor device 4 so that indoor air I exhausted from the ventilation unit 6 is guided to the air inhalation portion 24 formed in the outdoor device.

In the air conditioner according to the present exemplary embodiment, when operating the ventilation unit 6, outdoor air O is inhaled into the ventilation unit 6 through the outdoor air inhalation duct 8 and is inhaled into indoor through the outdoor air exhaust duct 10. The indoor air I is inhaled into the ventilation unit 6 through the indoor air inhalation duct 12, is exhausted to the inside of the outdoor device 4 through the guidance duct 14, and is exhausted to outdoor after passing through the outdoor device 4.

The guidance duct 14 is connected to one surface of the front, rear, left, and right of the outdoor device 4.

That is, the outdoor air O is inhaled into indoor through the ventilation unit 6, and the indoor air I is exhausted to outdoor after sequentially passing through the ventilation unit 6 and the outdoor device 4, and because the guidance duct 14 is connected to the ventilation unit 6 and the outdoor device 4, installation space of the guidance duct 14 can be fully secured, and it is unnecessary to construct the guidance duct 14 to penetrate an outer wall of a building, thereby reducing a construction cost.

Figure 2:
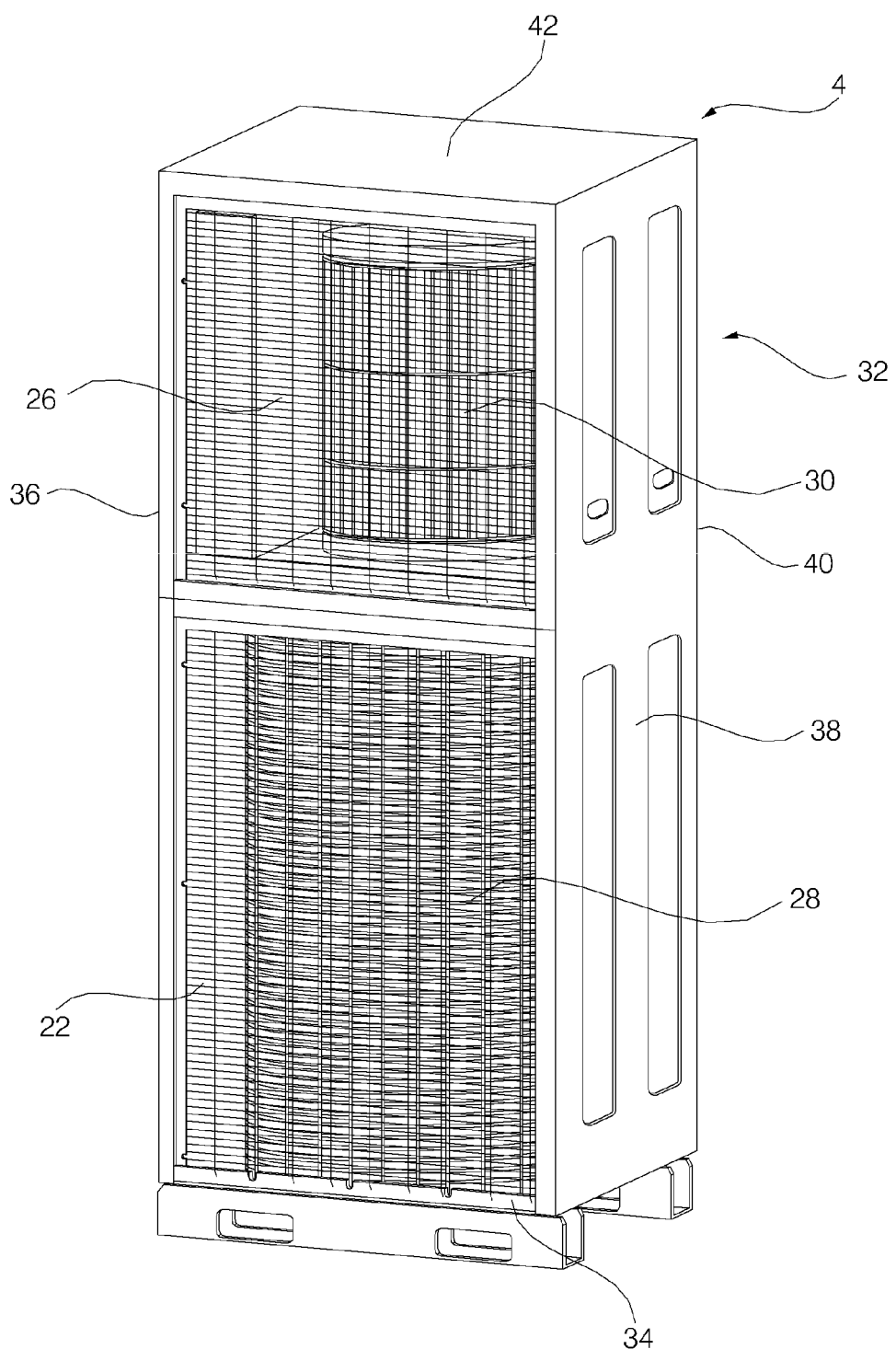
FIG. 2 is an enlarged perspective view illustrating an outdoor device in the air conditioner of FIG. 1.
Figure 3:
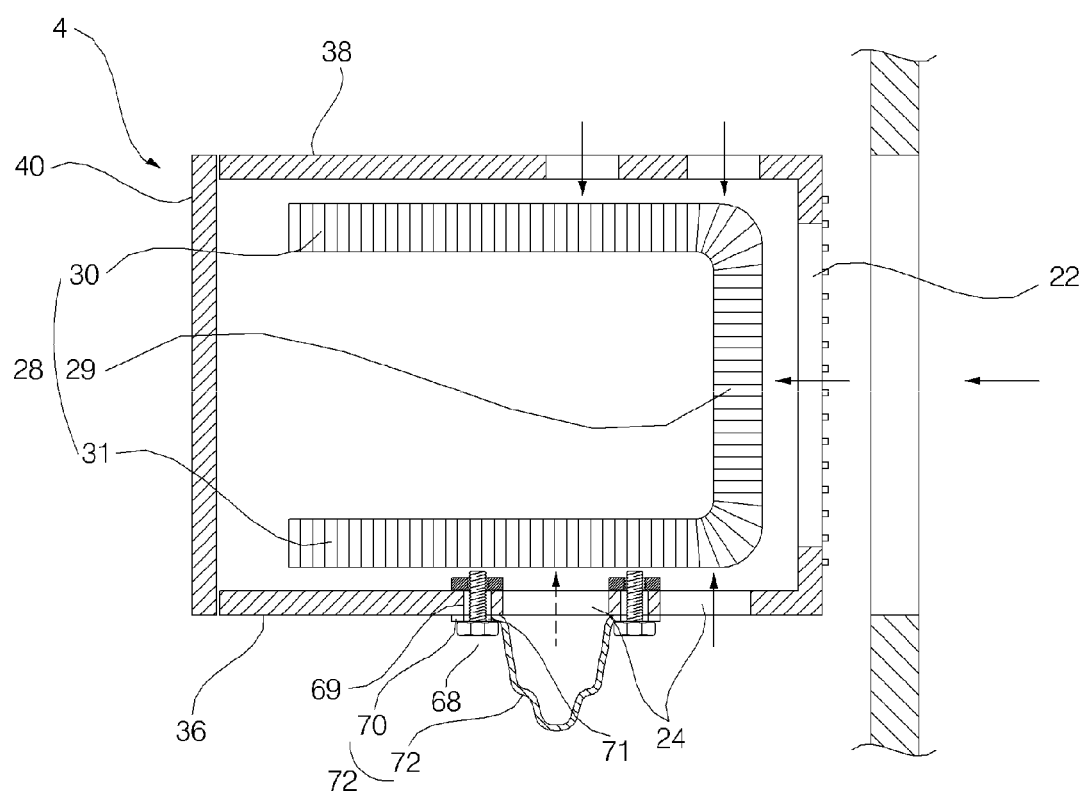
FIG. 3 is an enlarged cross-sectional view of an outdoor device in the air conditioner of FIG. 1.
Figure 4:
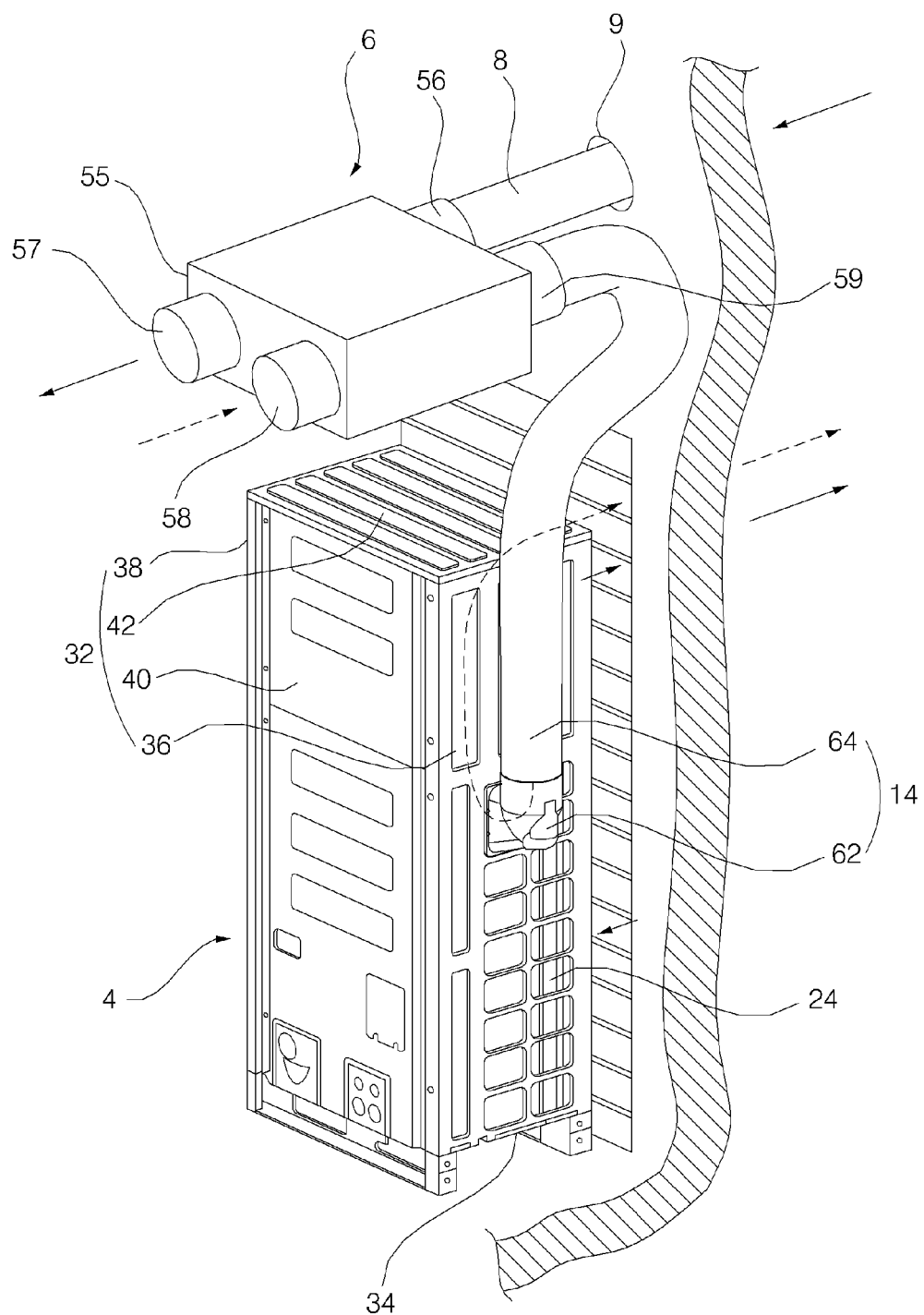
FIG. 4 is an enlarged perspective view illustrating a ventilation unit and an outdoor device in the air conditioner of FIG. 1.
Figure 5:
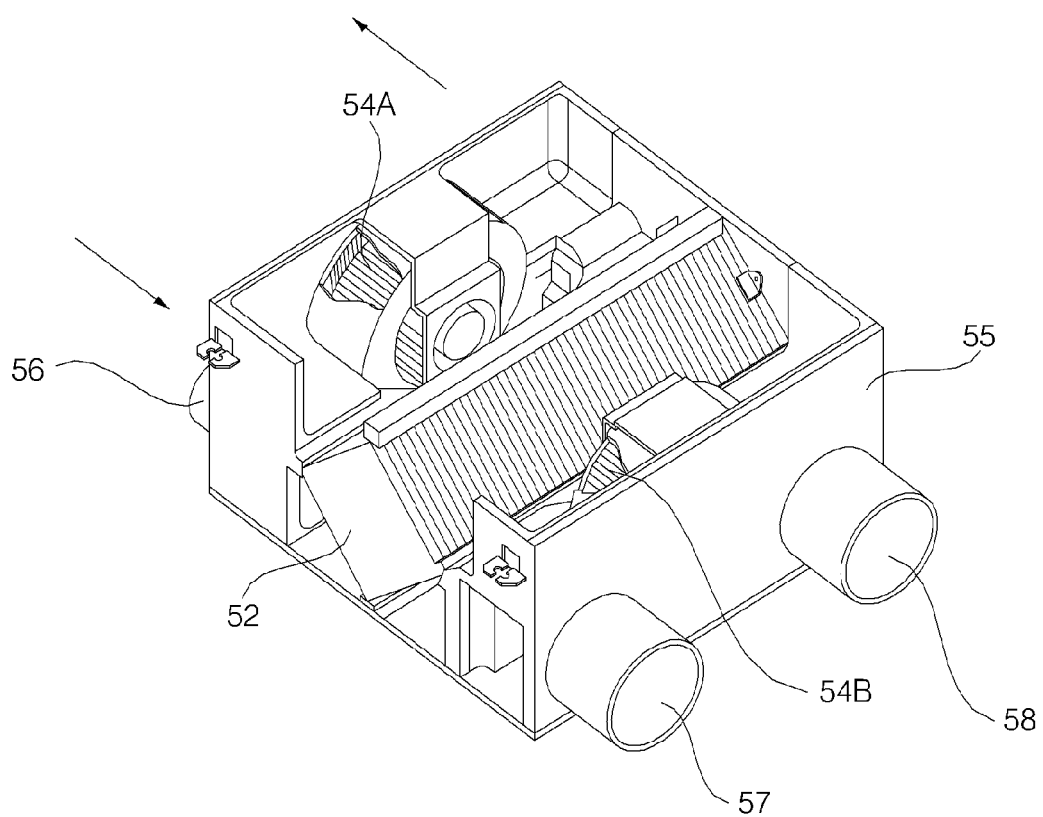
FIG. 5 is a perspective view illustrating an internal configuration of a ventilation unit in the air conditioner of FIG. 1.
Figure 6:
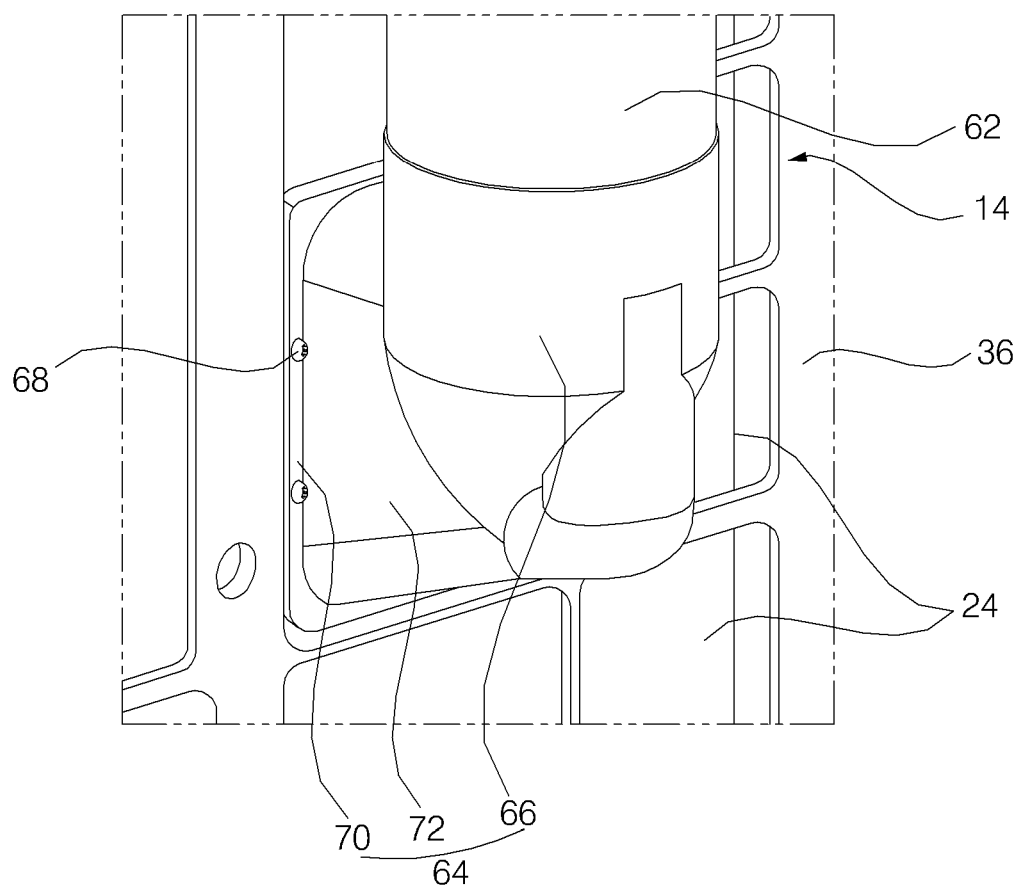
FIG. 6 is a partially enlarged perspective view illustrating a guidance duct shown in FIG. 4.
Figure 7:
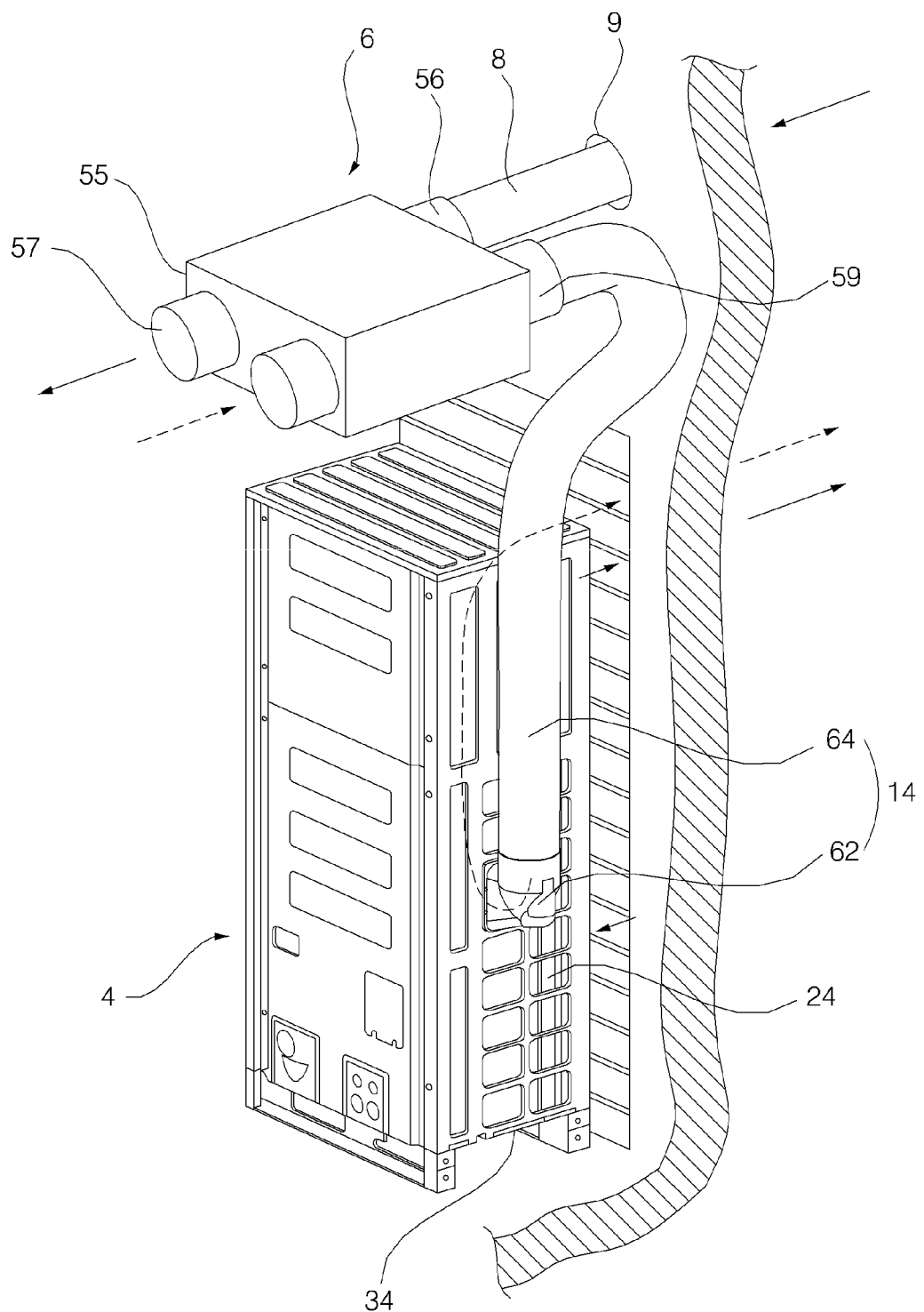
FIG. 7 is an enlarged perspective view illustrating a guidance duct shown in FIG. 4 connected in a low height.

FIG. 2 is an enlarged perspective view illustrating an outdoor device in the air conditioner of FIG. 1, FIG. 3 is an enlarged cross-sectional view illustrating an outdoor device in the air conditioner of FIG. 1, FIG. 4 is an enlarged perspective view illustrating a ventilation unit and an outdoor device shown in FIG. 1, FIG. 5 is a perspective view illustrating an internal configuration of a ventilation unit shown in FIG. 1, FIG. 6 is a partially enlarged perspective view illustrating a guidance duct shown in FIG. 4, and FIG. 7 is an enlarged perspective view illustrating a guidance duct shown in FIG. 4 connected in a low height.

The outdoor device 4 is installed in the bottom of an outdoor device installation room A, air inhalation portions 22 and 24 are formed in at least one surface of a circumferential portion, and an air discharge portion 26 is formed in at least the other surface or an upper surface of the circumferential portion.

The outdoor device 4 includes an outdoor heat exchanger 28 for exchanging heat of outdoor air O and a refrigerant and an outdoor fan 30 for injecting the outdoor air O into the outdoor device 4.

In the outdoor device 4, it is preferable that the air inhalation portion 22 is formed in a surface toward outdoor of a circumferential surface and the air inhalation portion 24 is formed in at least one of the left and right side surfaces in order to quickly inhale outdoor air and to inhale indoor air I exhausted from the ventilation unit 6 into the outdoor device 4.

In the outdoor device 4, the outdoor heat exchanger 28 and the outdoor fan 30 are installed within a cabinet 32 for forming an external appearance, and in the cabinet 32, the air inhalation portion 22 is formed in a surface toward outdoor among four circumferential surfaces, in one of the left and right side surfaces, the air inhalation portion 24 is formed.

The heat exchanger 28 is disposed at a lower part of the inside of the cabinet 32, and a sectional shape thereof is formed in shape and thus the left and right side portions 30 and 31 are formed opposite to the left and right side surfaces of the cabinet 32.

The heat exchanger 28 includes a rear heat exchange portion 29 disposed at the rear side of the inside of the cabinet 32 and left and right side portions 30 and 31 folded to be orthogonal to the left and right sides of the rear heat exchange portion 29 or folded to be rounded.

The fan 30 is disposed at an upper part of the inside of the cabinet 32 and inhales air of a lower part thereof and discharges the air to the rear side, i.e., the air discharge portion 26.

The cabinet 32 includes a base 34, left and right side panels 36 and 38 installed at the upper side of the left and right sides of the base 34, a shield panel 40 for blocking an entire surface between the left and right side panels 36 and 38, and a top panel 42 installed at the upper side of the left and right side panels 36 and 38 and the shield panel 40 in order to block an upper surface between the left and right side panels 36 and 38 and the shield panel 40.

The left and right side panels 36 and 38 have the air inhalation portion 24 at a position opposite to the heat exchanger 28.

The air inhalation portion 24 may be formed with one opening and may be formed with a plurality of openings separated in the front-rear direction and the vertical direction, and hereinafter, the air inhalation portion 24 is formed by a grill portion having a plurality openings by a horizontal grill portion and a vertical grill portion.

The ventilation unit 6 includes a ventilation heat exchanger 52 for exchanging heat of indoor air I and outdoor air O and ventilation ventilators 54A and 54B for allowing indoor air I to pass through the ventilation heat exchanger 52, sending the indoor air I to the outdoor device 4, allowing outdoor air O to pass through the ventilation heat exchanger 52, and sending the outdoor air O to indoor, as shown in FIG. 5.

In the ventilation heat exchanger 52, an indoor air flow path for passing through the indoor air I and an outdoor air flow path for passing through the outdoor air O are partitioned with a heat transfer member 52A interposed therebetween.

The ventilation unit 6 includes a ventilation case 55 having the ventilation heat exchanger 52 and a ventilation fan 54 therein, and the ventilation case 55 has an indoor air inhalation duct connection part 56 to which the outdoor air inhalation air duct 8 is connected, an outdoor air exhaust duct connection part 57 to which the outdoor air exhaust duct 10 is connected, an indoor air inhalation duct connection part 58 to which the indoor air inhalation duct 12 is connected, and a guidance duct connection part 59 to which the guidance duct 14 is connected.

The ventilation fans 54A and 54B include an indoor exhaust fan 54A for inhaling indoor air, allowing the indoor air to pass through the ventilation heat exchanger 52, and exhausting the indoor air to the guidance duct 14 and an outdoor inhalation fan 54B for inhaling outdoor air, allowing the outdoor air to pass through the ventilation heat exchanger 52, and exhausting the outdoor air to the outdoor air exhaust duct 10.

The guidance duct 14 includes a connection duct 62 connected to the outdoor device 4 to be opposite to at least a part of the air inhalation portions 22 and 24 and an exhaust duct 64 for connecting the ventilation unit 6 and the connection duct 62.

Here, the connection duct 62 is made of a material harder than that of the exhaust duct 64 and it is preferable that the connection duct 62 is made of a hard material to firmly support the exhaust duct 64 and the exhaust duct 64 is made of a ductile material that can be extended and retracted or bent.

In the guidance duct 14, it is preferable that the connection duct 62 is made of a plastic injection material and the exhaust duct 64 is formed with a corrugating duct that can be extended and retracted or bent.

The connection duct 62 includes an exhaust duct communication portion 66 for communicating with the exhaust duct 64, a fastening portion 70 fastened to the outdoor device 4, and an extension portion 72 formed between the exhaust duct communication portion 66 and the fastening portion 70 and having a flow path enlarging as advancing toward the air inhalation portion 24.

The exhaust duct communication portion 66 is formed long in a vertical direction to be inserted into the exhaust duct 14.

The fastening portion 70 is fastened to a side panel 36 in which the air inhalation portion 24 is formed among the left and right side panels 36 and 38.

The fastening portion 70 can be fastened by a screw 68, and the fastening portion 70 has a fastening hole 71 through which the screw 68 is penetrated to be fastened.

The fastening portion 70 is formed to protrude from an outer surface of an extension portion 72 and is formed with a surface contact portion for performing a surface contact with the outdoor device 4.

The extension portion 72 smoothly inhales indoor air I to the outdoor device 4 while minimizing flow noise of indoor air I and has a flow path gradually enlarging from a lower end of the exhaust duct communication portion 66 to the fastening portion 70.

In the side panel 36 in which the air inhalant port 24 is formed among the left and right side panels 36 and 38, a plurality of fastening holes 69 in which the screw 68 is selectively fastened are separated in a vertical direction.

The fastening hole 69 is formed around an opening of a side panel 36 in which the air inhalant port 24 is formed among the left and right side panels 36 and 38.

The screw 68 is fastened to sequentially penetrate the fastening hole 71 formed in the guidance duct 14 and the fastening hole 69 formed in the outdoor device 4.

The fastening portion 70 can be fastened to the outdoor device 4 in a variable fastening height, and in the fastening portion 70, a plurality of fastening holes 69 in which the fastening portion 80 is selectively fastened are formed in a vertical direction in the side panel 36 in which the air inhalant port 24 is formed among the left and right side panels 36 and 38.

For example, four fastening holes 69 are formed in both side portions of the front and the rear of the fastening portion 70, four screws 68 fasten both side portions of the front and the rear of the fastening portion 70 to the outdoor device, and the fastening holes 69 of a multiple of 4, i.e., 8, 12, 16, . . . , 4N are formed in the outdoor device 4, particularly in the side panel 36.

In the fastening portion 70, when the extension portion 72 is fastened to communicate with one of a plurality of openings, a height in which indoor air is inhaled into the outdoor device 4 is adjusted according to a fastening height thereof.

It is preferable that the connection duct 62 is fastened to communicate with an opening of an uppermost side among a plurality of openings in consideration of a length of the exhaust duct 64, but the connection duct 62 can be fastened to communicate with another opening positioned at the lower side of an opening of the uppermost side according to a situation of the outdoor device installation room A.

A function of the present invention having the above-described configuration is described.

Hereinafter, in the outdoor device 4, an air inhalant port 22 formed in a surface toward outdoor, i.e., in a rear surface is referred to as a rear air inhalant port 22, an air inhalant port 24 formed in a side surface is referred to as a side air inhalant port 24, and an air discharge port 26 formed in a surface toward outdoor, i.e., in a rear surface is referred to as a rear air discharge port 26.

When operating the indoor device 2, the outdoor device 4, and the ventilation unit 6, the outdoor air O is inhaled into the outdoor device 4 through the rear air inhalant port 22, exchanges heat with the outdoor heat exchanger 28, and is discharged again to outdoor through the rear air discharge port 26. Outdoor air O positioned at outdoor is inhaled into indoor while sequentially passing through the outdoor air inhalation duct 8, the ventilation heat exchanger 52, and the outdoor air exhaust duct 10.

When the outdoor air O flows, the indoor air I is inhaled into the indoor device 2, is cooled/heated, and is discharged to indoor and the indoor air I positioned at indoor is flowed into the ventilation unit 6 through the indoor air inhalation duct 12, and the indoor air I exchanges heat with the outdoor air O inhaled through the outdoor air inhalation duct 8 from outdoor while passing through the ventilation heat exchanger 52 installed within the ventilation unit 6, is heated/cooled, is guided to the guide duct 14, and is flowed to the outdoor device 4.

The indoor air I flowed to the outdoor device 4 is inhaled into the outdoor device 4 through at least one of a plurality of openings of the side air inhalation portion 24, and exchanges heat with a refrigerant while passing through a part of the outdoor heat exchanger 28, and thereafter the indoor air I is mixed with outdoor air O inhaled into the outdoor device 4 from outdoor and is discharged to outdoor through the rear air inhalation portion 24.

That is, while the indoor air I passes through the ventilation unit 6, waste heat is transmitted to outdoor air O supplied from outdoor to indoor, is transmitted again from the inside of the outdoor device 4 to the outdoor heat exchanger 28, is mixed with outdoor air O, and is discharged to outdoor.

Upon performing such an operation, when the air conditioner performs a heating operation, indoor air I contacts with the outdoor heat exchanger 28 to exchange heat and thus frost of the outdoor heat exchanger 28 is delayed or defrost is performed and efficiency of a heating operation is improved.

When the air conditioner performs a cooling operation, indoor air I guided to the outdoor device 4 is in a cooling state in the indoor device 2 and thus contacts with the outdoor heat exchanger 28 in a temperature lower than that of outdoor air O, and condensation performance of the outdoor heat exchanger 28 can be enhanced and efficiency when performing a cooling operation can be improved, compared with when only outdoor air O exchanges heat with the outdoor heat exchanger 28.

Figure 8:
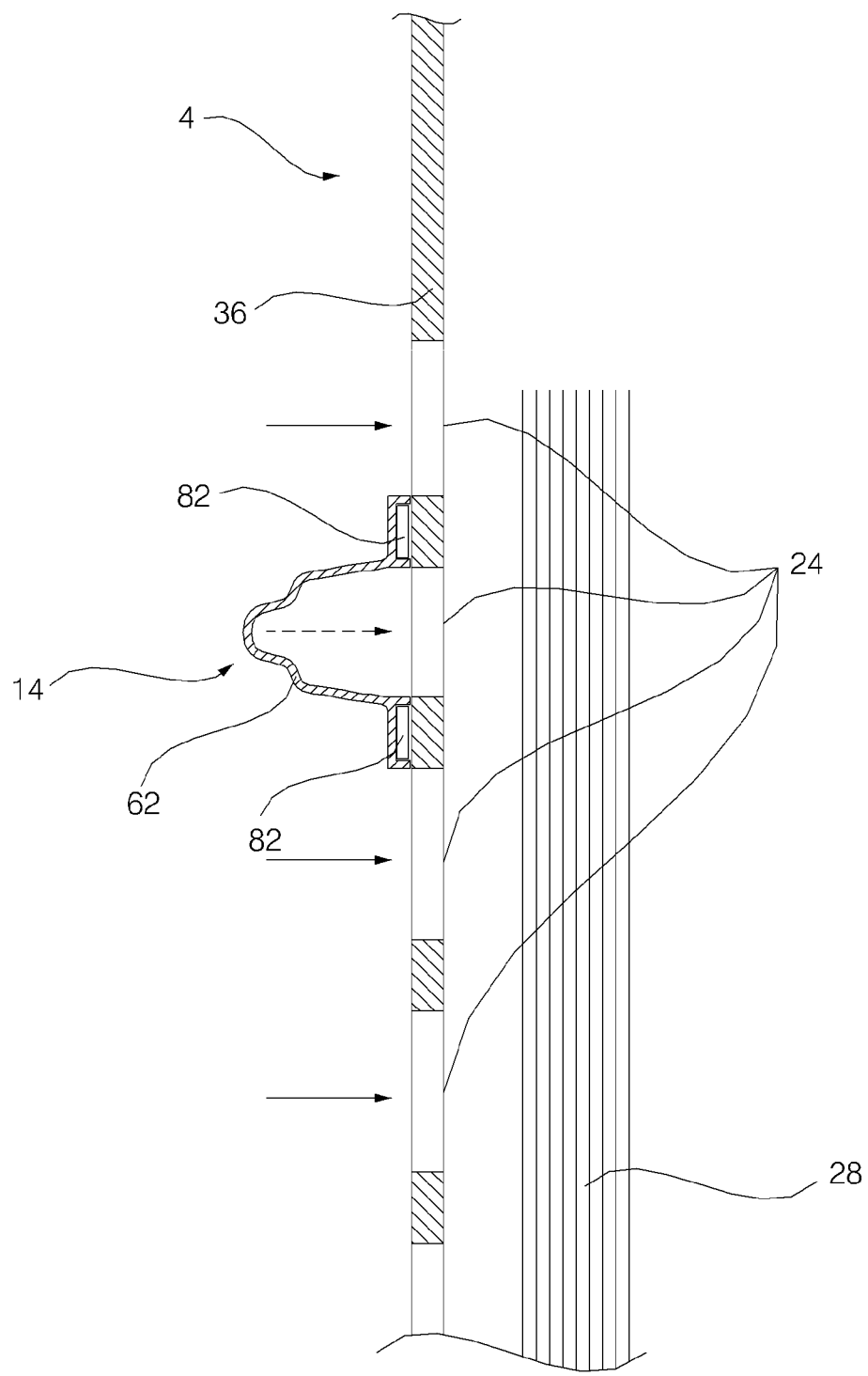
FIG. 8 is an enlarged cross-sectional view illustrating a major part of a connection structure of a guidance duct and an outdoor device of an air conditioner according to a second exemplary embodiment of the present invention.

FIG. 8 is an enlarged cross-sectional view illustrating a major part of a connection structure of a guidance duct and an outdoor device of an air conditioner according to a second exemplary embodiment of the present invention.

In the air conditioner according to the present exemplary embodiment, a cabinet of the outdoor device 4, particularly a side panel 36 having an air inhalant port 24 is made of a magnetic substance, and the fastening portion 70 of the guidance duct 14 includes a magnet 82 detached to the outdoor device 4 by a magnetic force, other configurations other than the magnet 82 and operation thereof are equal to or similar to those of the first exemplary embodiment according to the present invention, and therefore a detailed description thereof will be omitted.

The outdoor device 4 has a plurality of openings forming an air inhalation portion 24, and the magnet 82 is detached by a magnetic force around one of the openings, as in the first exemplary embodiment of the present invention.

The magnet 82 is inserted into a magnet insertion hole 84 formed in the fastening portion 70 and is installed in the fastening portion 70 by adhesives or a hook.

In the air conditioner according to the present exemplary embodiment, when the guidance duct 14 is communicated in a height lower than the outdoor device 4, the magnet 82 is fixed by a magnetic force to close contact with a periphery of an opening positioned at the lower side of a plurality of openings, and when the guidance duct 14 is communicated in a height higher than the outdoor device 4, the magnet 82 is fixed by a magnetic force to close contact with a periphery of an opening positioned at the upper side of a plurality of openings.

That is, an operator can adjust a height in which indoor air is sent to the outdoor heat exchanger 28 according to a height in which the connection duct 62 of the guidance duct 14 closely contacts with the outdoor device 4.

For example, when frost is excessively generated on a part of the outdoor heat exchanger 28, by adjusting the connection duct 62 of the guidance duct 14 to a height corresponding to a portion in which frost is overly generated among the outdoor heat exchanger 28, frost can be minimized from being excessively generated in a part of the outdoor heat exchanger 28, and a connection duct 62 of the guidance duct 14 is communicated to a position having best cooling/heating performance.

Figure 9:
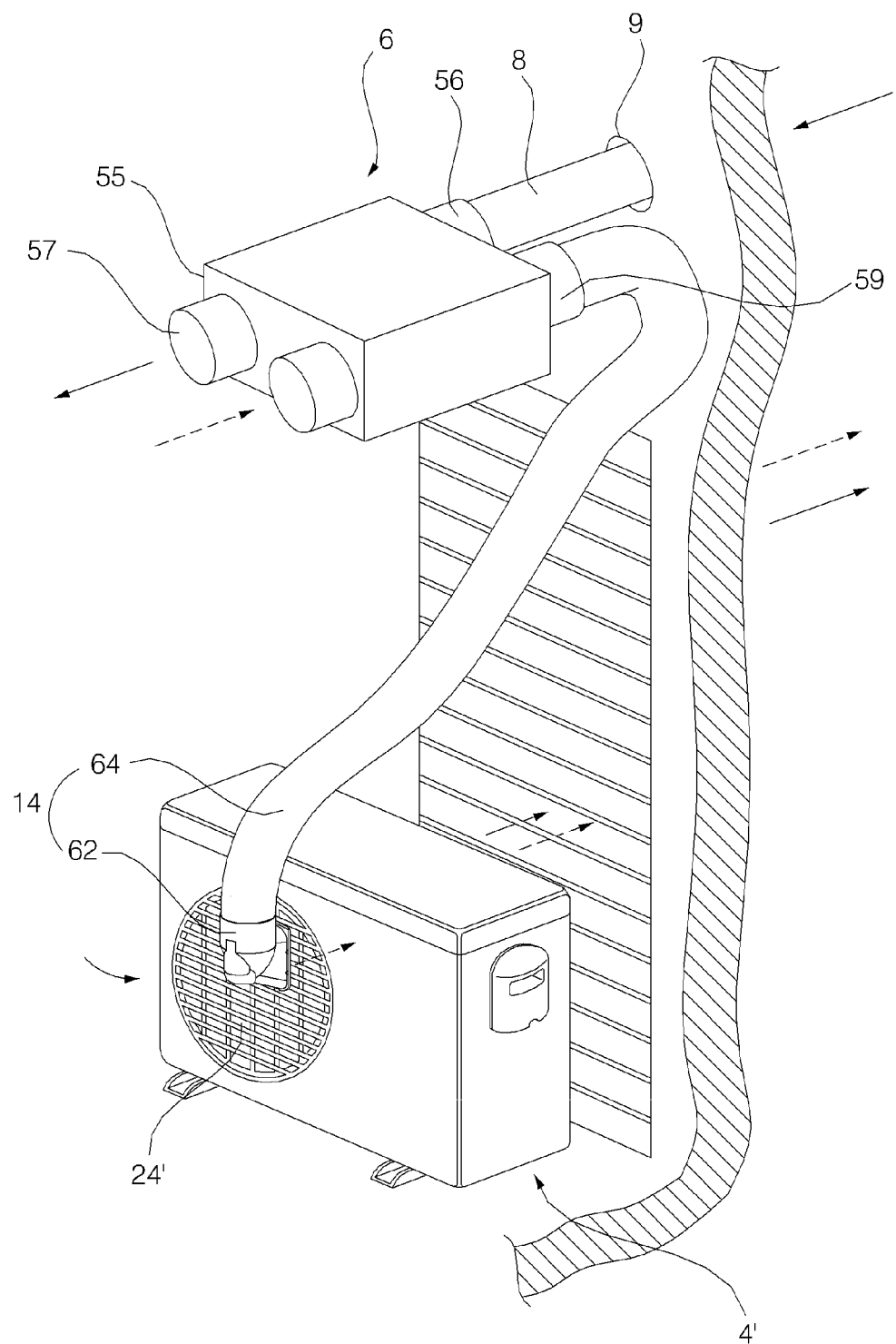
FIG. 9 is a schematic perspective view illustrating a state in which a guidance duct of an air conditioner according to a second exemplary embodiment of the present invention is selectively connected to various kinds of outdoor devices.

FIG. 9 is a schematic perspective view illustrating a state in which a guidance duct of an air conditioner according to the second exemplary embodiment of the present invention is selectively connected to an outdoor device of a different type from the outdoor device according to the first exemplary embodiment of the present invention.

In the air conditioner according to the present exemplary embodiment, the guidance duct 14 can be connected to the outdoor device 4 having an inhaling and discharge structure different from that of the outdoor device 4 shown in FIG. 4.

The outdoor device 4 shown in FIG. 9 has an inhalant and discharge structure different from that of the outdoor device 4 shown in FIG. 4 and has a flow path structure of inhaling outdoor air through the front surface as an air inhalant port 24 is formed in a front surface thereof and of discharging outdoor air to a rear surface as an air discharge port is formed in a rear surface, and in the guidance duct 14, the exhaust duct 64 is extended and retracted or bent so that the connection duct 62 is positioned at the front of the air inhalant port 24.

In the outdoor device 4 shown in FIG. 9, an inhalation grill for protecting the air inhalant port 24 can be disposed at a front surface, the inhalation grill is made of a magnetic substance, and the guidance duct 14 is detached to the inhalation grill by a magnetic force.

That is, when a user installs a new indoor device and outdoor device 4 while using the ventilation unit 6, a communication position of the guidance duct 14 can be varied to correspond to an inhalant and discharge structure of the new outdoor device 4 and in this case, the new indoor device and outdoor device 4 can minimize frost and cooling/heating performance can be improved, and the ventilation unit 6 and the guidance duct 14 can be shared regardless of a type of the indoor device and the outdoor device 4.

Figure 10:
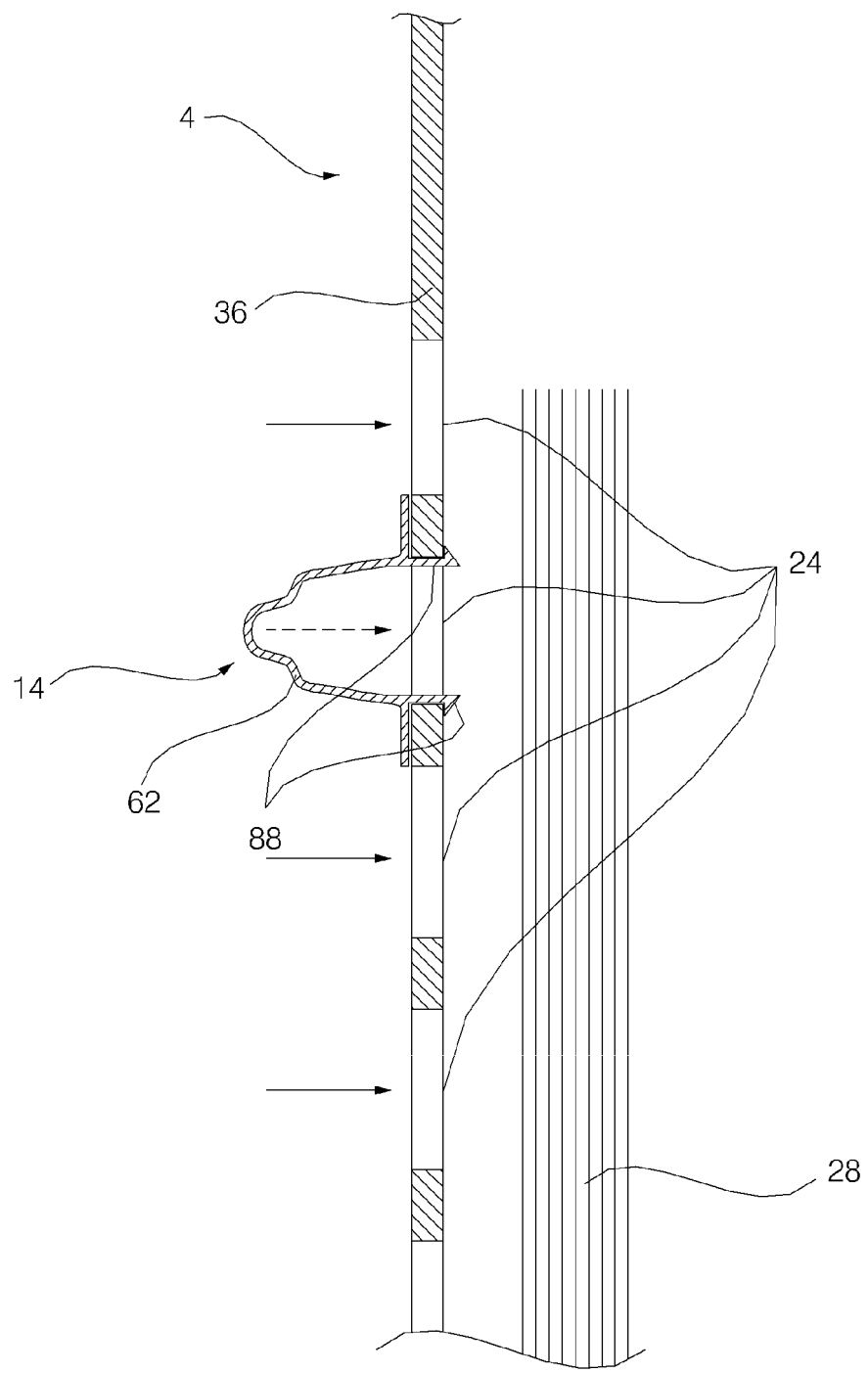
FIG. 10 is an enlarged cross-sectional view illustrating a major part of a connection structure of a guidance duct and an outdoor device of an air conditioner according to a third exemplary embodiment of the present invention.

FIG. 10 is an enlarged cross-sectional view illustrating a major part of a connection structure of a guidance duct and an outdoor device of an air conditioner according to a third exemplary embodiment of the present invention.

The air conditioner according to the present exemplary embodiment includes a hook 88 in which the fastening portion 70 of the guidance duct 14 is detachably latched to the outdoor device 4, and configurations other than the hook 88 and operation thereof are equal to or similar to those of the first exemplary embodiment of the present invention and therefore a detailed description thereof will be omitted.

In the outdoor device 4, a plurality of openings forming the air inhalation portion 24 can be formed, and the hook 88 is inserted into and latched to one of a plurality of openings, as in the first exemplary embodiment of the present invention.

When the guidance duct 14 is communicated with the outdoor device 4 in a low height, the hook 88 is inserted into and latched to an opening positioned at the low side of a plurality of openings, and when the guidance duct 14 is communicated with the outdoor device 4 in a high height, the hook 88 is inserted into and latched to an opening positioned at the upper side of a plurality of openings.

That is, an operator can adjust a height in which indoor air is ventilated to the outdoor heat exchanger 28 according to a height in which the connection duct 62 of the guidance duct 14 is latched to the outdoor device 4.

Figure 11:
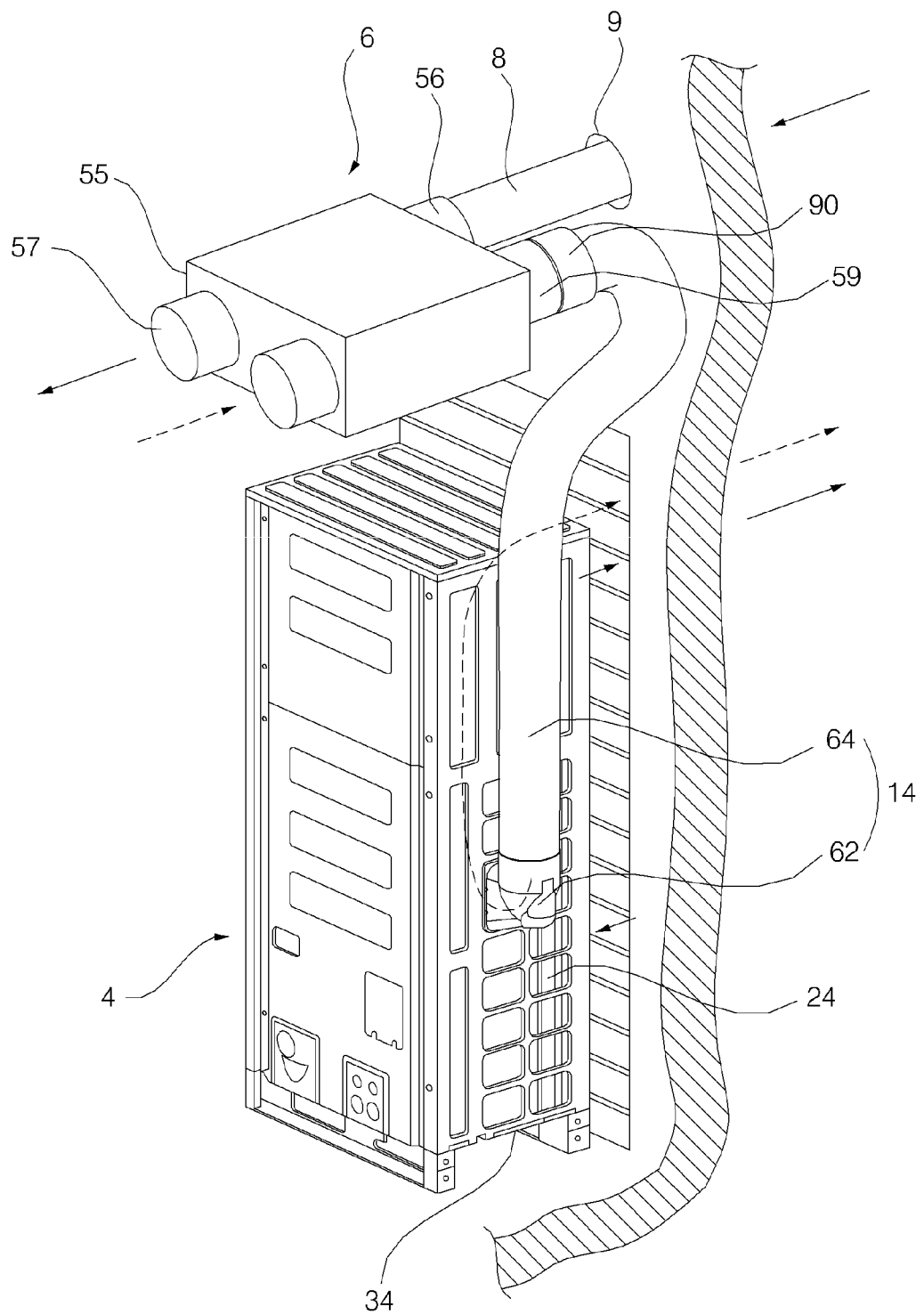
FIG. 11 is a perspective view illustrating an air conditioner according to a fourth exemplary embodiment of the present invention.
Figure 12:
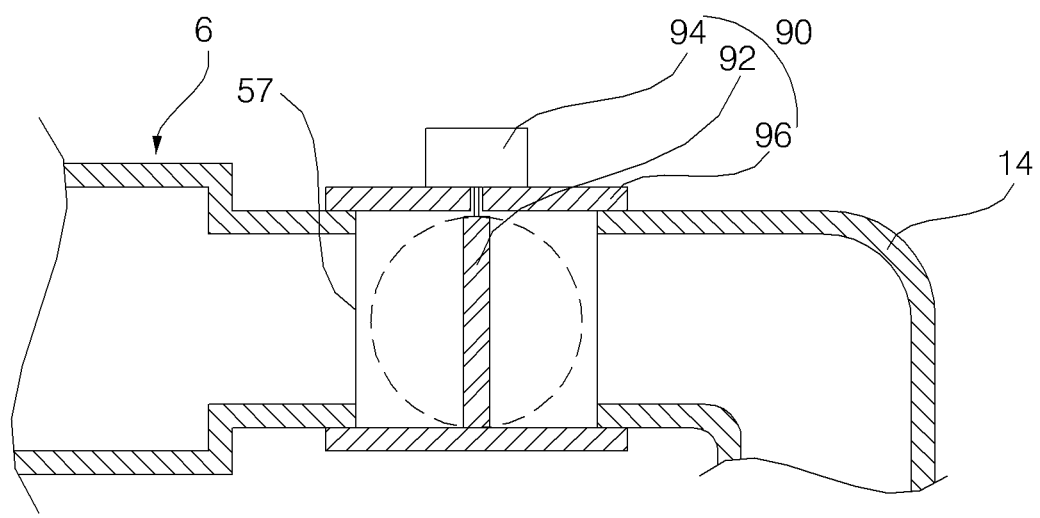
FIG. 12 is a cross-sectional view illustrating a guidance duct of an air conditioner according to a fourth exemplary embodiment of the present invention.

FIG. 11 is a perspective view illustrating an air conditioner according to a fourth exemplary embodiment of the present invention, and FIG. 12 is a cross-sectional view illustrating a guidance duct of an air conditioner according to a fourth exemplary embodiment of the present invention.

The air conditioner according to the present exemplary embodiment further includes a damper 90 for opening and closing the guidance duct 14, configurations other than the damper 90 are equal to or similar to those of the first exemplary embodiment to the third exemplary embodiment of the present invention, and a detailed description thereof will be omitted.

The damper 90 may be installed between the ventilation unit 6 and the guidance duct 14 to block space between the ventilation unit 6 and the guidance duct 14 and may be installed in the guidance duct 14 to block space between one end and the other end of the guidance duct 14.

The guidance duct 14 includes an opening and closing body 92 for opening and closing an exhaust passage of indoor air and a driving source 94 for opening and closing the opening and closing body 92.

Hereinafter, the damper 90 includes a damper body 96 having one end communicating with the guidance duct connection part 59 and having the other end communicating with the guidance duct 14.

The opening and closing body 92 is rotatably disposed within the damper body 96 to open and close an internal passage of the damper body 96 according to a position thereof.

The driving source 94 includes a driving motor installed at the outside of the damper body 96 to rotate the opening and closing body 92 in a parallel direction to the exhaust passage of indoor air or in an orthogonal direction to an exhaust passage of indoor air.

It is preferable that the driving source 94 is connected by a lead wire to the ventilation unit 6 or is connected by a lead wire to the outdoor device 4.

In the air conditioner according to the present exemplary embodiment, it is preferable that the driving source 94 is controlled according to a user's manipulation or an outdoor temperature and operation of the ventilation unit 6.

When a user's manipulation through a remote control is stop of exhaust of indoor air, when an outdoor temperature detected in an outdoor temperature sensor installed in the outdoor air inhalation portion 22 of the outdoor device 4 is a low temperature of a setting temperature or less, or when the ventilation unit 6 is stopped, the controller controls the driving source 94 to an interception mode, and the damper 90 intercepts an indoor air exhaust passage between the ventilation unit 6 and the outdoor device 4

Figure 13:
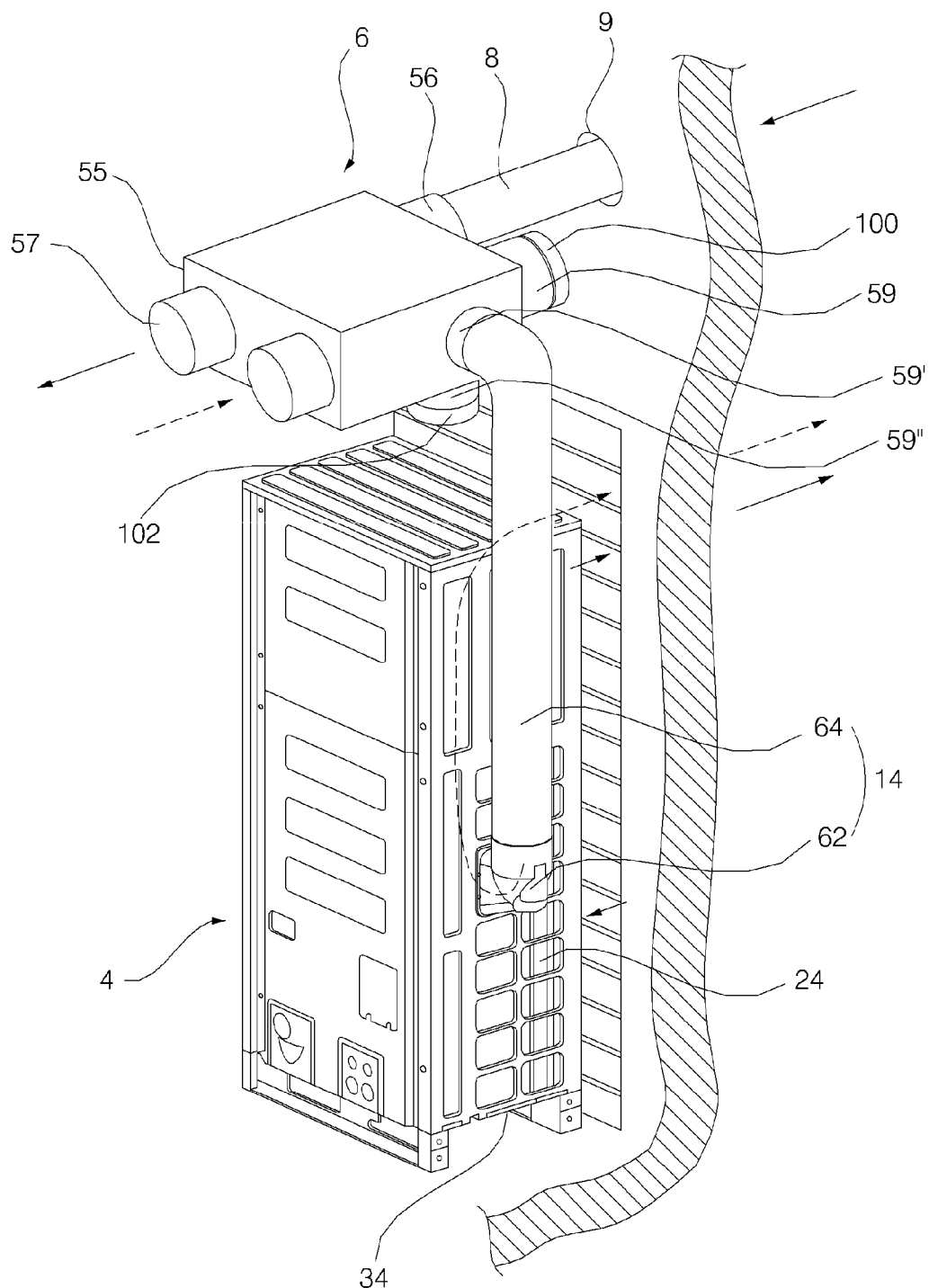
FIG. 13 is an enlarged perspective view illustrating a ventilation unit and an outdoor device of an air conditioner according to a fifth exemplary embodiment of the present invention.

FIG. 13 is an enlarged perspective view illustrating a ventilation unit and an outdoor device of an air conditioner according to a fifth exemplary embodiment of the present invention.

In the air conditioner according to the present exemplary embodiment, a plurality of guidance duct connection parts 59, 59, and 59 in which the guidance duct 14 is communicated with the ventilation unit 6 are formed in different directions, and the guidance duct 14 is selectively connected to one 59 of the plurality of guidance duct connection parts 59, 59, and 59.

In the ventilation unit 6, stoppers 100 and 102 for blocking guidance duct connection parts 59 and 59 in which the guidance duct 14 is not communicated among a plurality of guidance duct connection parts 59, 59, and 59 are installed.

The guidance duct connection parts 59, 59, and 59 include a first guidance duct connection part 59 formed in a length direction of the ventilation unit 6 or a flow path forming direction of indoor air O, i.e., a surface toward outdoor of the ventilation unit 6 in the ventilation unit 6, and a second guidance duct connection part 59 formed in an orthogonal direction to the first guidance duct connection part 59 in the ventilation unit 6.

The guidance duct connection parts 59, 59, and 59 may include a third guidance duct connection part 59 connected orthogonal to a first guidance duct connection part 59 and the second guidance duct connection part 59 other than the first guidance duct connection part 59 and the second guidance duct connection part 59.

That is, when the first guidance duct connection part 59 is formed in one of a front surface and a rear surface of the ventilation unit 6, the second guidance duct connection part 59 is formed in one of a left surface and a right surface of the ventilation unit 6, the third guidance duct connection part 59 is formed in one of an upper surface and a lower surface of the ventilation unit 6, and an operator can optimally connect the guidance duct 14 to the ventilation unit 6 in consideration of a size and shape of an outdoor device installation room A.

In the air conditioner according to the present exemplary embodiment, configurations other than a plurality of guidance duct connection parts 59, 59, and 59 and stoppers 100 and 102 and operation thereof are equal to or similar to those of the first exemplary embodiment to the fourth exemplary embodiment of the present invention and are denoted by the same reference numerals and therefore a detailed description thereof will be omitted.

As describe above, in the air conditioner according to the present invention, because indoor air exhausted from a ventilation unit is inhaled into an air inhalant port of an outdoor device by passing through a guidance duct and is exhausted to outdoor by passing through the outdoor device, the number of ventilation holes to form in an outer wall of a building can be minimized and a construction cost can be reduced.

Further, upon performing a heating operation, indoor air exhausted from the ventilation unit can minimize generation of frost on an outdoor heat exchanger of the outdoor device while passing through an outdoor heat exchanger of the outdoor device and defrost performance can be enhanced.

Further, because a guidance duct in which indoor air is exhausted does not penetrate an outer wall of a building and communicates with the outdoor device, an external appearance of the building can be improved.

Further, even when an outdoor device installation room is small and narrow, a guidance duct can be constructed to correspond to a shape of the outdoor device installation room.

Further, because a guidance duct can be variously connected according to a situation of an outdoor device installation room, operation convenience of an operator can be enhanced.

Further, while a guidance duct has a variable length or is bent, the guidance duct can be connected to one of a plurality of positions of the outdoor device, and thus a construction can be conveniently performed, and space can be effectively used.

The embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air conditioner comprising:
   an indoor device installed at indoor;
   an outdoor device connected to the indoor device using a refrigerant pipe;
   a ventilation unit for exchanging heat of outdoor air and indoor air while ventilating indoor air and outdoor air; and a guidance duct for communicating the ventilation unit and a plurality of air inhalation portions of the outdoor device in order to guide indoor air exhausted from the ventilation unit to the air inhalation portion formed in the outdoor device, wherein the ventilation unit comprises:

a ventilation heat exchanger for exchanging heat of indoor air and outdoor air;

a ventilation fan for sending indoor air to the outdoor device after passing through the ventilation heat exchanger and for sending outdoor air to indoor after passing through the ventilation heat exchanger; and a ventilation case having the ventilation heat exchanger and the ventilation fan therein, wherein the ventilation case has an outdoor air inhalation duct connection part to which an outdoor air inhalation duct is connected, an outdoor air exhaust duct connection part to which an outdoor air exhaust duct is connected, an indoor air inhalation duct connection part to which an indoor air inhalation duct is connected, and a plurality of guidance duct connection parts to which the guidance duct is connected, wherein the guidance duct connects with one of the plurality of guidance duct connection parts, wherein the outdoor device comprises a base, left and right side panels installed at an upper side of the base, and a top panel installed at an upper side of the left and right side panels, at least one of the left and right side panels includes a plurality of openings forming the plurality of air inhalation portions formed at different heights, and the guidance duct has a fastening portion wherein the guidance duct is adjusted to fit any one of the plurality of air inhalation portions.

2. The air conditioner of claim 1, wherein the plurality of guidance duct connection parts comprise:

a first guidance duct connection part formed in one of a front surface and a rear surface of the ventilation unit; and a second guidance duct connection part formed in one of a left surface and a right surface of the ventilation unit.

3. The air conditioner of claim 1, further comprising stoppers for blocking a guidance duct connection part with which the guidance duct is not communicated among the plurality of guidance duct connection parts.

4. The air conditioner of claim 1, further comprising a damper for opening and closing the guidance duct.

5. The air conditioner of claim 1, wherein the guidance duct comprises:

a connection duct installed in the outdoor device to be opposite to a portion of the air inhalation portion; and an exhaust duct for connecting the ventilation unit and the connection duct.

6. The air conditioner of claim 5, wherein the connection duct is made of a material harder than that of the exhaust duct.

7. The air conditioner of claim 5, wherein the connection duct comprises:

an exhaust duct communication portion communicated with the exhaust duct;

a fastening portion fastened to the outdoor device;

an extension portion formed between the exhaust duct communication portion and the fastening portion and having a flow path enlarging as advancing toward the air inhalation portion.

8. The air conditioner of claim 5, wherein the exhaust duct is formed to extend and retract or bend.

9. The air conditioner of claim 1, wherein the fastening portion has a fastening hole for fastening to the outdoor device using a screw, at least one of the left and right side panels has a fastening hole around the opening, and the screw is fastened to the fastening hole formed around the opening by penetrating a fastening hole of the fastening portion.

10. The air conditioner of claim 1, wherein the fastening portion comprises a magnet to be detached with a magnetic force to the outdoor device, and the magnet is detached to a periphery of the opening with a magnetic force.

11. The air conditioner of claim 1, wherein the fastening portion comprises a hook inserted into the opening to be latched.

12. The air conditioner of claim 1, wherein in the ventilation heat exchanger, an indoor air flow path for passing through indoor air and an outdoor air flow path for passing through outdoor air are partitioned with a heat transfer member interposed therebetween.

13. The air conditioner of claim 1, wherein the ventilation unit is separated from the outdoor device at an upper side of the outdoor device.

* * * * *